United States Patent [19]

Naden et al.

[11] Patent Number: 4,502,952
[45] Date of Patent: Mar. 5, 1985

[54] CONTROL DEVICE

[75] Inventors: David Naden, Stockton-on-Tees; David G. Webster, Yarm; Gordon Willey, Stockton-on-Tees, all of England

[73] Assignee: Davy McKee (Stockton) Limited, Cleveland, England

[21] Appl. No.: 508,597

[22] Filed: Jun. 28, 1983

[30] Foreign Application Priority Data

Jun. 28, 1982 [GB] United Kingdom ............... 8218634

[51] Int. Cl.³ ............................................. B01D 15/02
[52] U.S. Cl. ........................................ 210/86; 210/97; 210/138; 210/189
[58] Field of Search ................. 210/86, 97, 104, 111, 210/138, 189, 407, 418, 143

[56] References Cited

U.S. PATENT DOCUMENTS 3,512,640  5/1970  Hellman ............................ 210/138
4,133,759  1/1979  Ikeda et al. ....................... 210/138

FOREIGN PATENT DOCUMENTS 645694  2/1979  U.S.S.R. ............................ 210/189

OTHER PUBLICATIONS

Dr. Ing. Gotthold Quittkat, "Erzaufbereitung", (1967), pp. 33 & 55.

Primary Examiner—Ivars Cintins
Attorney, Agent, or Firm—Bernard, Rothwell & Brown

[57] ABSTRACT

A control device for controlling the transfer of adsorbent to and from stages of an adsorbant-in-pulp contactor comprises a vessel for receipt of an adsorbent-pulp mixture and having an inclined screen for retention of adsorbent particles and passage of pulp, means for transferring adsorbent-pulp mixture to the vessel, means for measuring the volume of adsorbent or of adsorbent-pulp mixture in the vessel, and outlet means adjacent the lower end of the screen for recovery of drained adsorbent solids.

8 Claims, 6 Drawing Figures

| BAND | | V | | Q | | K | | X | | S | | L | | P | |
|---|---|---|---|---|---|---|---|---|---|---|---|---|---|---|---|
| FREQ. (GHz) | 56 | | 46 | | 36 | | 10.9 | | 5.2 | | 1.55 | | 0.39 | | 0.225 |
| MIDD-BAND 'λ' (CM) | | 0.15 | | 0.3 | | 0.6 | | 3 | | 10 | | 30 | | 100 | |

CONTROL DEVICE

This invention relates to a control device, more particularly to a device for controlling the transfer of adsorbent to and from stages of a resin-in-pulp or a carbon-in-pulp contactor.

In a resin-in-pulp process a metal ore in finely divided form is leached with a suitable lixivant and then contacted with a solid ion exchange resin having dependent substituent groups capable of adsorbing metal values from the loaded lixiviant. Typically the ore is a uranium ore or tailings from a gold mine and the metal to be recovered is uranium. In such a process the ion exchange resin usually bears amino substituents, whilst the lixiviant is normally sulphuric acid. The resin-in-pulp process is also applicable to the recovery of the metals, e.g. copper and gold, from their ores.

A related process is the carbon-in-pulp process which was developed for the recovery of gold from cyanide leach liquors.

A description of the resin-in-pulp process appears, for example, in British patent specification No. 807094 and in U.S. Pat. No. 2,743,154. A review of both the resin-in-pulp process and the carbon-in-pulp process will be found in a paper "Alternative processes to filtration: carbon-in-pulp and resin-in-pulp in the metallurgical industry", by C. A. Fleming and M. J. Nicol, Hydrometallurgy 81, pages C 2/1 to C 2/16, published by Society of Chemical Industry. This paper was presented at a Society of Chemical Industry symposium held at the University of Manchester Institute of Science and Technology, Manchester, England from June 30th to July 3rd, 1981.

In either case the process is usually carried out in several stages and involves the problem of retaining the loaded adsorbent (i.e. the loaded resin or carbon) in each stage whilst allowing the metal value-depleted pulp to flow on to the next stage. Perhaps the most commonly adopted expedient involves providing each stage with a screen whose perforations are of a size such that the particles of ore in the pulp can pass through but the absorbent particles cannot. In the apparatus of the afore-mentioned British and United States patent specifications the screen forms essentially a complete wall of each stage. In the apparatus of FIG. 1 of the afore-mentioned paper by Fleming et al the screen is provided at the upper end of one or more of the side walls of each stage.

In the course of operation the adsorbent becomes loaded with metal values. British patent specification No. 807094 describes in relation to FIG. 4 thereof an arrangement in which an Archimedes screw 15, operating in a cylinder 16 provided with a screen section 17, is used to transfer resin solids from one stage to the next in order to allow countercurrent flow of pulp and resin through the various stages of resin-in-pulp contactor. FIGS. 5 to 8 of the same specification illustrate an arrangement with 8 cells or stages which operate on the so-called carousel principle; in this case the resin is not moved from cell to cell but the supply of fresh pulp and of eluant for the loaded resin is switched from cell to cell in turn.

More recent designs, however, have involved air-lifting of the resin (or carbon) and the pulp on to an external screen, with the resin overflow from the screen being diverted to the next stage up the line, while the pulp underflow from the screen returns to the stage of origin. Problems, however, arise in practice with such designs in that careful supervision is required of all stages to ensure that the resin is evenly distributed throughout the pulp in every stage.

The present invention accordingly seeks to provide an improved means of controlling the amount of adsorbent in each stage, and the transfer of resin between stages, in a resin-in-pulp or carbon-in-pulp contactor.

According to the present invention there is provided a control device for controlling the transfer of adsorbent to and from stages of an adsorbent-in-pulp contactor comprising a vessel for receipt of an adsorbent-pulp mixture and having an inclined screen for retention of adsorbent particles and passage of pulp, means for transferring adsorbent-pulp mixture to the vessel, means for measuring the volume of absorbent or of adsorbent-pulp mixture in the vessel, and outlet means adjacent the lower end of the screen for recovery of drained absorbent solids.

In order that the invention may be clearly understood and readily carried into effect, a preferred embodiment thereof will now be described, by way of example only, with reference to FIG. 1 of the accompanying diagrammatic drawings, which is a vertical section through a control device constructed according to the invention.

Figure 1:
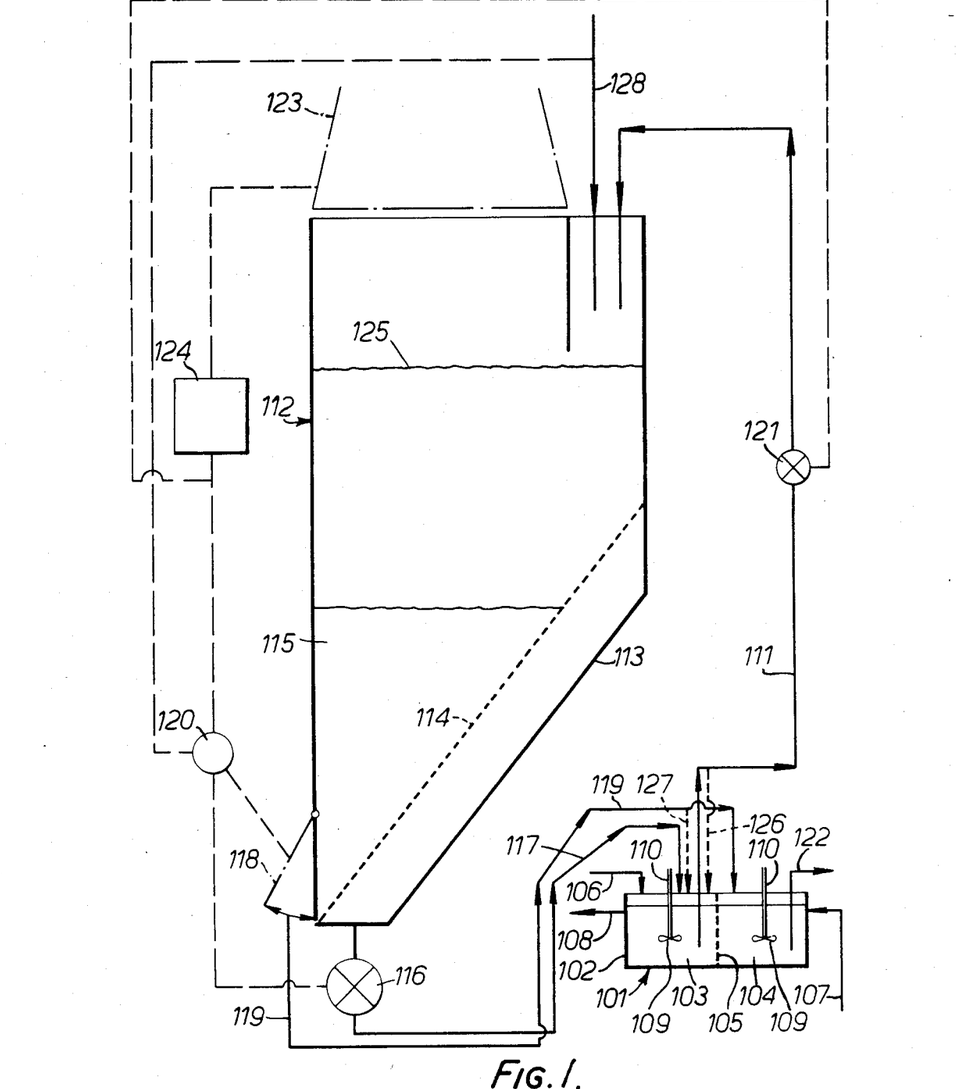

Referring to FIG. 1 of the drawings, which is diagrammatic only and is not drawn to scale, a resin-in-pulp contactor 101 comprises a rectangular plan tank 102 which is divided into first stage 103 and second stage 104 by means of a vertical screen 105. For the sake of simplicity two stages only are shown but it will be appreciated by those skilled in the art that in practice it will usually be desirable to include 3, 4 or more stages, e.g. up to about 7 or more.

Resin of controlled bead size, e.g. a+22 mesh (British Standard Test Sieve) resin, i.e. a resin with a particle size of 699 micrometers or larger, is supplied to first stage 103 as indicated by line 106 whilst a uranium ore pulp containing, for example, −200 mesh (British Standard Test Sieve) ore particles (i.e. particles with a diameter of less than 76 micrometers) is supplied by way of line 107 to second stage 104. Pulp passes from second stage 4 to first stage 103, in countercurrent to the resin as will be described hereafter, through screen 5, the apertures in which are intermediate in size between the particle sizes of the resin and of the ore particles in the pulp. Lean pulp exits first stage 103 by way of line 108. Impellers 109 on vertical shafts 110 are driven by variable speed motors (not shown) so as to cause mass circulation of the resin-pulp mixture in each of the stages.

A mixture of resin and pulp is withdrawn from first stage 103 as indicated by line 111 and passed to a control device 112. An air lift or Archimedes screw can be used for raising the resin-pulp mixture from first stage 103 to control device 112.

Control device 112 is illustrated at a much larger scale than the remainder of the apparatus of FIG. 1. It is in the form of a rectangular section box having a sloping bottom 113 and fitted with an inclined screen 114, the apertures in which are intermediate in size between the resin particle size and the ore particle size. For example when using +22 mesh resin particles and a pulp with −200 mesh ore particles, the screen may be an 80 mesh screen may be an 80 mesh screen. (Mesh sizes relate to British Standard Test Sieve). Pulp passes through screen 114 into a sump between screen 114 and the sloping bottom 113 of the box but resin particles are retained on screen 114, as indicated by reference numeral 115.

Underflow pulp from screen 114 is returned from the sump by way of valve 116 and line 117 to first stage 103. Resin collected at 115 is discharged intermittently from device 112 by way of valve 118 and passed as indicated by line 119 to second stage 104 or returned to stage 103 by line 127.

A timing device 120 is used to control a valve 121 in line 111 as well as valves 116 and 118. Loaded resin is removed from second stage 104 by way of line 122.

The device 112 is fitted with a detector 123 for measuring the volume of resin-pulp mixture in the device 112 and/or the volume of the drained resin 115. Detector 123 can be, for example, a micro-wave detector of the type described below in relation to FIGS. 2 to 6 of the accompanying drawings. Alternatively detector 123 can be a contact probe, an ultrasonic detector or a nucleonics detector arranged to feed data to a control device 124, such as a microprocessor, linked to timer 120. Alternatively detector 123 may comprise a pair of conducting plates arranged to dip into the resin-pulp mixture with a measuring circuit arranged to measure the capacitance between the plates and hence the volume of pulp and/or resin between the plates and hence the corresponding volume thereof in the device 112.

The invention may be used to control the transfer of resin from one stage to the next in the following way:

In operation of the illustrated control device resin-pulp mixture is air lifted via line 111 to device 112. During this step valve 116 is left open so that pulp drains continuously through screen 114 and back into first stage 103 by way of line 117. When the level of resin in the device 112 has reached a predetermined level the flow of resin-pulp mixture to device 112 by way of line 111 is stopped, the body of resin 115 is allowed to remain on the screen 114 until the pulp has drained below the resin surface (e.g. for a further 1 to 2 minutes), whereupon valve 118 is opened by timer 120 and the resin mass 115 is flushed, using water or barren solution from line 128, into second stage 104 as indicated by line 119. The cycle can then be repeated at fixed intervals depending on the rate of resin transfer required.

Using the procedure described above a uniform quantity of resin can be transferred in each cycle from one stage to the next. In addition it will be readily apparent to those skilled in the art that devices similar to device 112 can equally be used to transfer resin to first stage 103 and to remove loaded resin by way of line 122. In this way the rate of resin transfer to and from each stage can be controlled at all stages of operation of the process.

Alternatively the device 12 can be used to calculate the quantity of resin transferred in each transfer period and to make adjustments as required. In this case valves 16 and 18 both remain closed during the initial transfer operation of resin-pulp mixture to the device 12. Detector 123 then measures the volume of resin-pulp mixture in the device, the upper level of which is indicated at 125 at this stage, whereupon valve 116 is opened and the resin allowed to drain for a set period. The detector 123 measures the volume of the drained resin mass 115 and so calculates the resin concentration in the resin-pulp slurry. This information can then be used by microprocessor 124 to vary the time for which valve 121 remains open or to vary the air supply to the air lift device (not shown) in line 111 so as to adjust the volume of resin-pulp mixture transferred on the next cycle, and hence to vary the volume of resin transferred in each cycle until the system re-adjusts itself to the desired conditions. In this way the resin-in-pulp contactor can be run with a minimum of supervision.

Instead of using device 12 to effect bulk transfer of resin from stage to stage it can alternatively be used to monitor the resin concentration in the relevant stage. In that case a recycle line 126 may be provided to provide, together with line 111 and its associated air lift device (not shown) a small continuously recycling sampling system for first stage 103. A separate air lift (not shown) is in this case provided to enable resin transfer to second stage 104. In this case device 12 is relatively small.

In operation of this modification of the invention valves 116 and 118 are closed and valve 21 is opened until a predetermined volume of resin-pulp mixture has been transferred from first stage 103 to device 12. When a preselected sample size has been collected, as monitored by the detector 123 and indicated at 125, valve 16 is opened or the underflow pulp is allowed to drain back to first stage 103 by way of line 117. The volume of drained resin 115 is then measured by detector 123 and the result used by microprocessor 124 to calculate the resin concentration. This information is then used as necessary to adjust automatically the air supply to the main air lift device used for inter-stage resin transfer. In this way the amount of resin in each stage can be controlled to a desired value. The drained sample 115 of resin can be dumped back in first stage 103 by way of line 127.

It is of course within the scope of the invention to utilise within the same resin-in-pulp contactor apparatus both one or more large resin control device 112 as illustrated for inter-stage resin transfer and also one or more small control device 112, modified as described above and each fitted with a detector 123 connected to a microprocessor 124, for controlling the resin concentration in the stages and hence the amount of resin in each stage.

Instead of using mesh, screen 114 can alternatively comprise closely spaced bars.

Although the invention has been specifically illustrated in relation to a resin-in-pulp contactor, it is equally within the scope thereof to utilise it in a carbon-in-pulp contactor.

According to the present invention there is provided a surface detector for remotely determining the position of a surface of a mass of material which comprises microwave generator means, wave guide means arranged to receive at one end thereof microwave energy from the generator means, means at the other end of the wave guide means for launching microwave energy into free space and for receiving reflected microwave energy from the surface whose position is to be determined, probe means mounted in the wave guide means for detecting the interference pattern set up in the wave guide means by interference between microwaves transmitted along the wave guide means from the generator means and microwaves reflected from the surface whose position is to be determined, and detector circuit means connected to and responsive to signals from the probe means for detecting changes in the interference pattern and hence relative movement between the detector and the surface whose position is to be determined.

Figure 2:
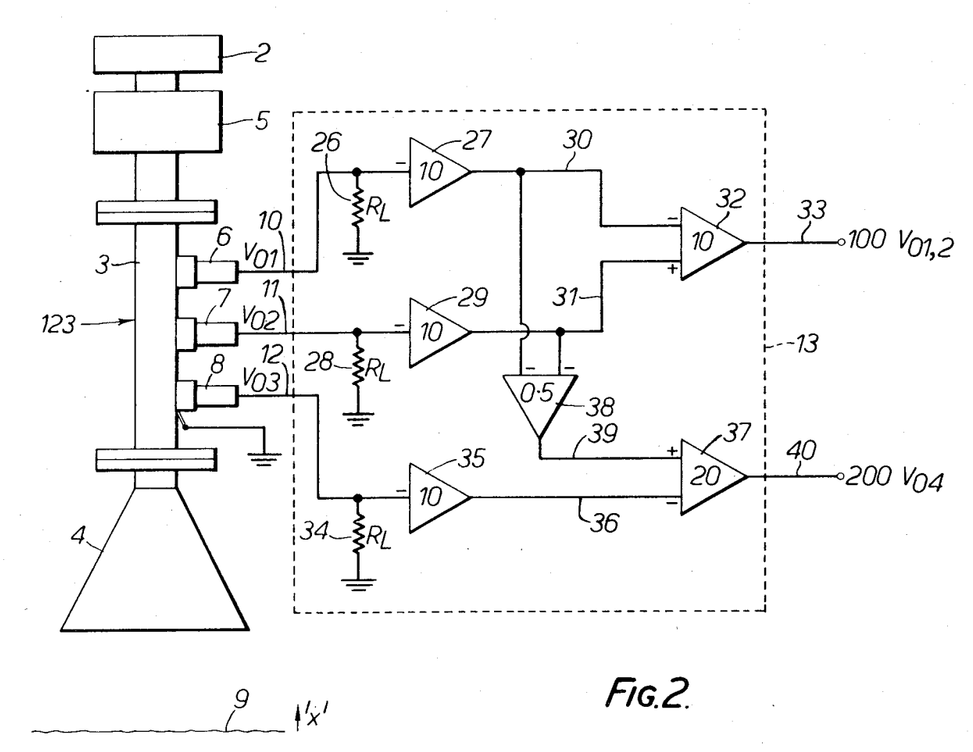
FIG. 2 is a diagrammatic side view of a surface detector constructed in accordance with the present invention, which incorporates a block diagram of the detector circuit.

Microwaves can be approximately classified by their position in the electro-magnetic spectrum as being any radiation of frequency between about 200 MHz and about 100 GHz. For ease of reference there exists a recognised subdividing of this range into smaller bands as shown in FIG. 6 of the drawings. Like all electro-magnetic waves microwaves can be described as composed of electric and magnetic fields varying in strength sinusoidally with time, their directions of oscillation being at right angles to each other and both being perpendicular to the direction of propagation. A horizontally polarised wave is defined as one in which the plane of the electric field is horizontal and a vertically polarised wave is one in which the plane of the electric field is vertical. Detector 123 is further illustrated in FIGS. 2 to 5 of the accompanying drawings, wherein:

Referring to FIG. 2 of the drawings, the detector 123 comprises a microwave generator 2 in the form of a "Gunn diode" to which is attached a wave guide 3 having a horn 4 at its other end for launching microwaves from the wave guide 3 into free space. Adjacent the microwave generator 2 is an attenuator 5 which can be used to vary the amount of microwave energy passing down the wave guide and, in particular, to stop most of the reflected energy from re-entering the generator. Reference numerals 6, 7 and 8 indicate probes mounted in the wave guide 3 for detecting the interference pattern set up in the wave guide 3 between microwaves transmitted therealong from the generator 2 and microwaves reflected from the surface 9 whose position is to be determined. These probes are connected by way of leads 10, 11 and 12 to a detector circuit 13, which is described in more detail below, for detecting changes in the interference pattern caused by relative movement between the detector 123 and the surface 9.

The microwave generator 2 is a so-called "Gunn diode". This is a two terminal solid state device which, when placed in a tuned cavity and connected to a suitable d.c. source, e.g. a 10v d.c. source, induces microwave oscillations in the cavity. The "diode" itself consists of an N-type low resistivity substrate of the order of 10 $\mu$m bonded to a layer of N-type Ga As; thus, although it is known as a "diode", it has in fact no P-N junction. Upon a d.c. bias being applied to the device, current spikes are generated at approximately $10^{-10}$ second intervals which generate sinusoidal microwave oscillations in the tuned cavity. Typically such a device has a maximum output power of about 20mW and is tunable over a frequency range of approximately 9 to 10.5 GHz, corresponding to a wavelength in the region of 3 cm.

The wave guide 3 is typically a rectangular section metal tube whose internal dimensions are approximately 23 mm$\times$10 mm. Such a wave guide is tuned to act as a guide for microwaves of approximately 3 cm wavelength.

The attenuator 5 is of conventional construction and serves to limit the amount of microwave energy passing down the wave guide 3 from the generator 2 so that the reflected microwaves do not interfere significantly with the operation of generator 2.

Vertically polarised microwaves of wavelength $\lambda$ can travel down the inside of a wave guide of height $\frac{1}{2}\lambda$ and width a along paths that are parallel to the top and bottom of the guide but reflected from side to side in the guide at a constant angle of reflection that is determined by the width a of the guide and the frequency f of the signal. It is, however, observed that the apparent wavelength in the guide 3 is greater than the wavelength is free space, the relationship between these two wavelengths being:

$$\frac{1}{(\lambda_g)^2} = \frac{1}{(\lambda_a)^2} - \frac{1}{(2a)^2}$$

where $\lambda_g$ is the guide wavelength, $\lambda_a$ is the "free space" wavelength and a is the width of the guide. Thus, as a is gradually increased, $\lambda_g$ approaches $\lambda_a$. This is the principle upon which horn 4 relies for launching a microwave from guide 3 into free space towards surface 9.

Figure 3:
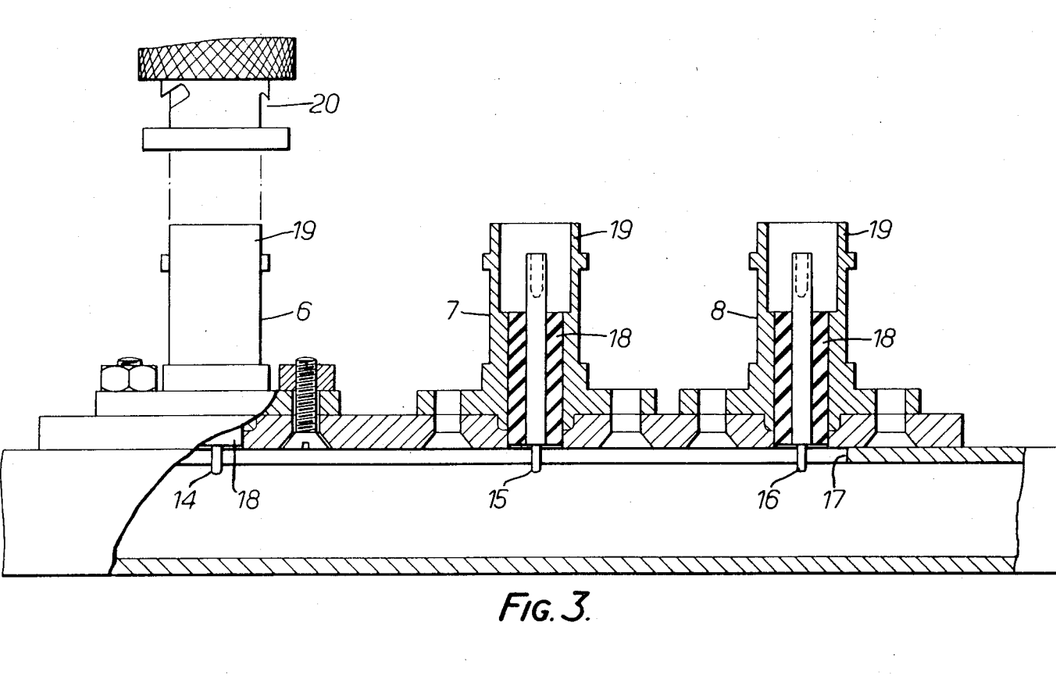
FIG. 3 is a detail sectional view of the probe arrangement mounted in the waver guide of the detector of FIG. 2.

The probes 6, 7, 8 are illustrated in greater detail in FIG. 3. These each comprise a respective probe wire 14, 15, 16, each of diameter approximately 0.5 mm, the tip of which projects approximately 0.5 mm into the wave guide 3 through a slot 17 approximately 3.21 mm wide forward in the side of the guide 3 along the center line of one of the broad walls thereof. Surrounding each of the probe wires 14, 15, 16 are insulating bushes 18 made, for example, of a fluorinated polymer material such as polytetrafluoroethylene so as to insulate each probe wire from the wall of the wave guide 3 itself. Around the bush 18 in each case is a 50 ohm b.n.c. socket 19 of a b.n.c. connector by means of which coaxially mounted crystal detectors 20 (only part of one of which is visible in FIG. 3) can be connected to the probe wires 14, 15, 16.

Figure 4:
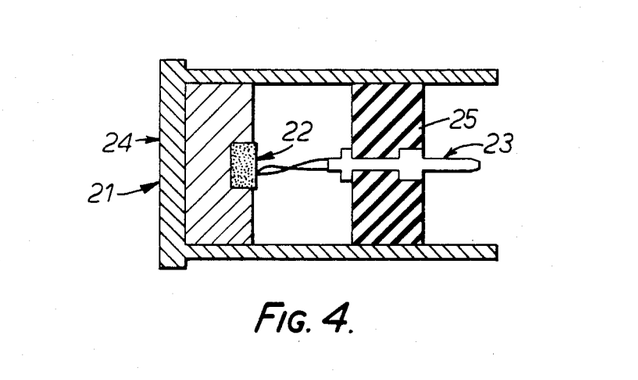
FIG. 4 is a detail sectional view of one of the cartridge diodes that is connected to each of the probes of FIG. 3.

The internal construction of one of the crystal detectors 20 is shown diagrammatically in more detail in FIG. 4. This comprises a cartridge diode 21 containing a gold-bonded germanium crystal 22 which serves to rectify the voltage signal detected by the cathode 23 from the probe wire (e.g. 14) to which it is connected and exhibits the characteristic that its input voltage to output current relationship is approximately a "square law" for low levels of input. The sensitivity of such crystal detectors is of the order 4 or 5 millivolts per microwatt input but this decreases with increasing frequency. The body 24 of the cartridge serves as anode and is connected to lead 10, 11 or 12, as the case may be. Cathode 23 is supported in an insulating bush 25.

Instead of a crystal detector a bolometer can be used; that is to say a device incorporating a temperature sensitive element which exhibits a change in resistance as it absorbs electromagnetic radiation. Such elements may comprise a barreter, i.e. a very thin platinum wire or a thermistor, which is a small bead of semi-conducting material.

Within wave guide 3 there is set up a standing wave pattern caused by interference between the transverse wave, $Y_1(t)$, being transmitted down the wave guide from the generator 2 and the reflected wave, $Y_2(t)$, caused by reflection from surface 9. At some point A, a distance $h=\frac{1}{2}n\lambda$ back from surface 9, where n is an integer, the equation for the voltage at A is:

$$Y_{1(A)} = a_1 \cdot \text{Cos } 2\pi ft \qquad (5)$$

where $a_1$ is the peak amplitude and f is the frequency. At a more general point P, a distance x from point A, the corresponding equation is:

$$Y_{1(P)} = a_1 \cdot \text{Cos } 2\pi(ft - x/\lambda)$$

The reflected wave, on the other hand is necessarily opposite in sign, but has an amplitude $a_2$ which is smaller than $a_1$, since the degree of reflection will in practice be less than 100%. Hence the reflected wave at a point P would be:

$$Y_{2(P)} = -a_2 \left[ \text{Cos } 2\pi \left( ft - \frac{h}{\lambda} - \frac{h-x}{\lambda} \right) \right]$$

$$= -a_2 \left[ \text{Cos } 2\pi \left( ft + \frac{x}{\lambda} - \frac{2h}{\lambda} \right) \right]$$

But $\text{Cos } 2\pi(z - 2h/\lambda) = \text{Cos } 2\pi z$,
since $2h/\lambda = n$ (an integer).
Thus $Y_{2(P)} = -a_2 \text{Cos } 2\pi(ft + x/\lambda)$
and by superposition $$Y_{T(t,x)} = Y_{1(t,x)} + Y_{2(t,x)}$$

$$= a_1 \text{Cos } 2\pi \left( ft - \frac{x}{\lambda} \right) - a_2 \text{Cos } 2\pi \left( ft + \frac{x}{\lambda} \right)$$

This equation describes the voltage component of the microwave standing wave pattern as detected by the probe wires 14, 15, 16. Relative movement between the surface 9 and the detector 1 alters the value of x and hence changes the standing wave pattern. Hence the position of surface 9 can be detected by monitoring changes in the standing wave pattern as will be described below.

Since crystal detectors 20 respond to the power in the wave it is convenient to consider the power present in the standing wave pattern. Since power is proportional to the voltage squared, then:

$$P_T \propto Y_T^2 \propto Y_I^2 + Y_R^2 + Y_I \cdot Y_R$$

where $Y_I$ is the incident wave voltage and $Y_R$ the reflected wave voltage. Hence:

$$P_T \propto a_1^2 \text{Cos}^2 2\pi \left( ft - \frac{x}{\lambda} \right) + a_2^2 \text{Cos}^2 2\pi \left( ft + \frac{x}{\lambda} \right) -$$

$$2a_1 a_2 \text{Cos } 2\pi \left( ft - \frac{x}{\lambda} \right) \cdot \text{Cos } 2\pi \left( ft + \frac{x}{\lambda} \right)$$

or $$P_T \propto \frac{a_1^2}{2} \left[ 2 + \text{Cos } 4\pi \left( ft - \frac{x}{\lambda} \right) + \text{Cos } 4\pi \left( ft + \frac{x}{\lambda} \right) \right] -$$

-continued $$2a_1 a_2 \left[ \text{Cos } 4\pi ft + \text{Cos } 4\pi \frac{x}{\lambda} \right]$$

$$= a_1^2 + a_2^2 \left[ \text{Cos } 4\pi ft \cdot \text{Cos } 4\pi \frac{x}{\lambda} \right] -$$

$$a_1 a_2 \left[ \text{Cos } 4\pi ft + \text{Cos } 4\pi \frac{x}{\lambda} \right]$$

Hence:

$$P_T = a_1^2 + \left[ a_1^2 \text{Cos } 4\pi \frac{x}{\lambda} - a_1 a_2 \right] [\text{Cos } 4\pi ft] - a_1 a_2 \text{Cos } 4\pi \frac{x}{\lambda}$$

Since the frequency f is 10 GHz and the band width of the equipment associated with the measurement of $P_T$ is less than 1MHz, the Cos $4\pi ft$ term is filtered out leaving:

$$P_T \propto a_1^2 - a_1 a_2 \text{Cos } 4\pi x/\lambda$$

or $$a_1^2 [1 - \Gamma \text{Cos } 4\pi x/\lambda]$$

where $\Gamma$, i.e. the reflection coefficient, $= a_2/a_1$. This is a standing wave of wavelength half that of the voltage standing wave pattern and of amplitude which can vary between the maximum and minimum limits of $P_T = 2a_1^2$ and $P_T = 0$ respectively (when $\Gamma$ has a maximum value of 1).

Measurement of a standing wave can be achieved using a single probe which is moved along the wave guide. In the illustrated detector 123, however, there are three probe wires 14, 15, 16 for reasons which will appear below. The spacing between probe wires 14 and 15 measured along the wave guide 3 is about 33 mm, whilst that between probe wires 15 and 16 is about 27 mm. These spacings correspond respectively to 3/2 wavelengths separation between probe wires 14 and 15 along the standing wave pattern and 5/4 wavelengths along the standing wave pattern between probe wires 15 and 16. Although ideally it would be preferable for these spacings to be $\frac{1}{2}$ and $\frac{1}{4}$ wavelengths respectively the physical limitations of the diode encapsulations making this impossible; thus spacings of 3/2 and 5/4 wavelengths represent the best compromise available. Hence if the voltage detected by probe wire 14, $V_{01}$, is given by the following equation:

$$V_{01} = a_1^2 (1 - \Gamma \text{Cos } 4\pi x/\lambda),$$

then the voltage, $V_{02}$, detected by probe wire 15 is given by the equation:

$$V_{02} = a_1^2 \left( 1 - \Gamma \text{Cos } \left[ 4\pi \frac{x}{\lambda} + (2n - 1)\pi \right] \right).$$

$$= a_1^2 \left( 1 - \Gamma \text{Cos } - 4\pi \frac{x}{\lambda} \right).$$

$$\therefore V_{02} = a_1^2 \left( 1 + \Gamma \text{Cos } 4\pi \frac{x}{\lambda} \right).$$

The voltage detected by probe wire 16, i.e. voltage $V_{03}$, is given by the equation:

$$V_{03} = a_1^2(1 = \Gamma \mathrm{Sin}\, 2\pi x/\lambda)$$

It will be seen that by subtracting the two waveforms one from another, the resultant wave form is given by the following equation:

$$V_{01,2} \equiv V_{01} - V_{02}$$

$$= a_1^2\left(1 - \Gamma \mathrm{Cos}\, 4\pi \frac{x}{\lambda}\right) - a_2^2\left(1 + \Gamma \mathrm{Cos}\, 4\pi \frac{x}{\lambda}\right)$$

$$= -2a_1^2 \Gamma \mathrm{Cos}\, 4\pi \frac{x}{\lambda}.$$

In this way the constant term $a_1^2$ is eliminated.

If, however, the two voltages are added, then the resulting waveform is:

$$(V_{01} + V_{02}) = 2a_1^2$$

By dividing this voltage in two and subtracting it from $V_{03}$, there is obtained a voltage:

$$V_{04} = a_1^2\left(1 - \Gamma \mathrm{Sin}\, 4\pi \frac{x}{\lambda}\right) - (2a_1^2 \times \tfrac{1}{2})$$

$$= -a_1^2 \Gamma \mathrm{Sin}\, 4\pi \frac{x}{\lambda},$$

i.e. a quadrature component of the wave form $V_{01,2}$ and without the unwanted constant $a_1^2$.

Addition and subtraction of the voltages detected by probes 6, 7 and 8 is achieved by means of the detector circuit which is indicated diagrammatically at 13 in FIG. 2. Voltage $V_{01}$ in line 10 is applied across load resistance 26 to amplifier 27 which has a gain factor of 10. In a similar manner voltage $V_{02}$ in line 11 is applied across load resistance 28 to the input of amplifier 29 which also has a gain factor of 10. The outputs from the amplifiers 27 and 29 are taken respectively in lines 30 and 31 and are applied to differential amplifier 32 which also has a gain factor of 10. The resultant signal in line 33 corresponds to 100 $V_{01,2}$.

The signal in line 12, i.e. voltage $V_{03}$, is applied across load resistance 34 to amplifier 35, which has a gain factor of 10 and whose output signal is applied by way of line 36 to an input terminal of a differential amplifier 37 having a gain factor of 20. The output signals from amplifiers 27 and 29 in lines 30 and 31 are added by means of amplifier 38 which has a gain factor 0.5. The output signal from amplifier 38 in line 29 is applied to the other input terminal of differential amplifier 37, the output from which in line 40 corresponds to 200 $V_{04}$.

Figure 5:
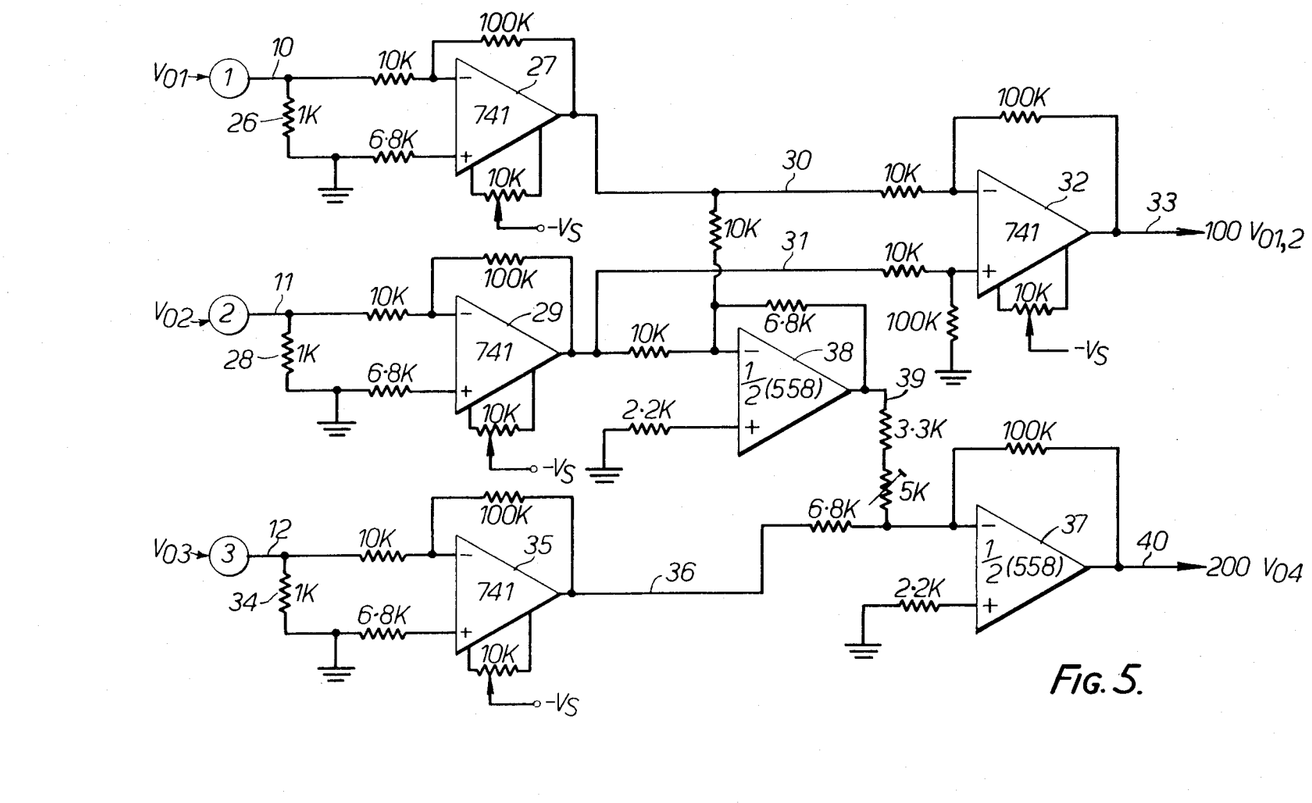
FIG. 5 is a circuit diagram of the detector circuit of FIG. 2.
Figure 6:
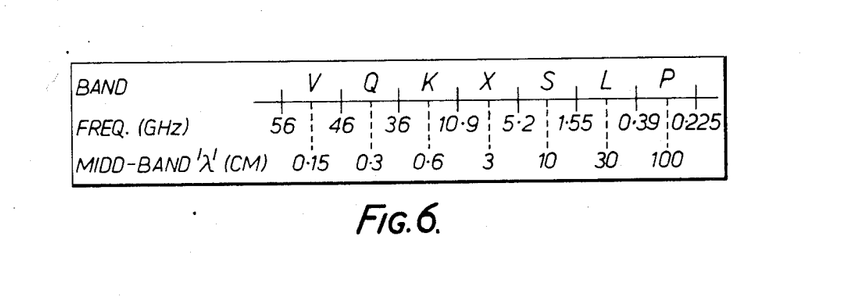
FIG. 6 shows a recognized sub-dividing of microwave bands.

A more detailed circuit diagram of detector circuit 13 will be found in FIG. 5.

The derived voltages $V_{01,2}$ and $V_{04}$ are 90° out of phase with each other. Voltage $V_{01,2}$ provides an analogue indication of the displacement x of surface 9 for small displacements about a node whilst voltage $V_{012}$ and $V_{04}$ are used in conjunction with each other to enable an up/down counter of conventional design to display large changes of the displacement x.

The up/down counting technique adopted is such that the counter display is incremented (or decremented) by one for changes in the displacement x equal to $\lambda/8$ a (typically 4mm increments or decrements).

To present the output signals $V_{01,2}$ and $V_{04}$ in a form suitable for up-down counting with a CMOS integrated circuit counter, it is necessary to transform the characteristic sinusoidal form of output into a square wave of "high" or "low" levels of 5 volts and 0 volts respectively. The transition between high and low levels occurs at the zero crossing points of the sinusoid.

This transformation is achieved by Schmitt-triggering the two voltages $V_{01,2}$ and $V_{04}$.

A high degree of accuracy of measurement can be achieved e.g. changes of level of the surface of the order of 5 micrometers can be detected.

We claim:

1. In or for an adsorbent-in-pulp contactor in which an adsorbent of predetermined particle size selected from resins and carbon is contacted in a plurality of stages with a pulp comprising ore particles having a particle size less than that of said adsorbent particles suspended in a liquid suspending agent and in which adsorbent is passed from stage to stage in countercurrent to the direction of flow of pulp through the contactor, the improvement comprising a control device for controlling the transfer of adsorbent to and from the individual stages of the contactor comprising a vessel for receiving and containing adsorbent-pulp mixture, said vessel having an inclined screen mounted therein, said inclined screen being adapted to retain adsorbent particles thereon but allow passage of pulp therethrough, transfer means for transferring adsorbent-pulp mixture to said vessel from a selected stage of the contactor and delivering same onto said screen thereof, pulp return means for returning to the contactor pulp that has passed through said screen, outlet means adjacent the lower end of said screen for recovery of drained adsorbent solids retained on said screen, valve means for controlling discharge of drained adsorbent solids from said vessel, volume measuring means for measuring the volume in the vessel of at least one material selected from drained adsorbent solids and adsorbent-pulp mixture, and control means for interrupting operation of said transfer means and for controlling opening of said valve means in dependence on an output signal from said volume measuring means.

2. A device according to claim 1, in which the vessel includes a sump below the screen for retaining pulp that has passed through the screen and means for intermittent discharge of pulp from the sump.

3. A device according to claim 2, in which the means for intermittent discharge of pulp from the sump comprises a timer-operated valve.

4. A device according to claim 1, in which said transfer means for transferring adsorbent-pulp mixture to said vessel comprises an air-lift pump.

5. A device according to claim 5, in which said transfer means for transferring adsorbent-pulp mixture to said vessel includes a timer-operated valve.

6. A device according to claim 1, in which said measuring means comprises a microwave detector.

7. A device according to claim 1, further including means for flushing adsorbent solids retained on the screen out of the vessel.

8. A control device according to claim 1, in which said valve means comprises a timer-operated valve arranged to allow a period of drainage for adsorbent solids retained on said screen prior to discharge thereof through said outlet means.

* * * * *